United States Patent [19]

Khaund

[11] Patent Number: 4,639,427

[45] Date of Patent: Jan. 27, 1987

[54] STRESS-CORROSION RESISTANT PROPPANT FOR OIL AND GAS WELLS

[75] Inventor: Arup K. Khaund, Niagara Falls, Canada

[73] Assignee: Norton Company, Worcester, Mass.

[21] Appl. No.: 750,714

[22] Filed: Jun. 28, 1985

[51] Int. Cl.$^4$ .............................................. C04B 35/10
[52] U.S. Cl. .................................. 501/128; 166/280; 501/105
[58] Field of Search ............... 166/280; 501/105, 107, 501/128, 127, 38

[56] References Cited

U.S. PATENT DOCUMENTS

| 3,642,505 | 2/1972 | Bakker | 501/128 |
| 3,972,722 | 8/1976 | Holt et al. | 501/105 |
| 4,068,718 | 1/1978 | Cooke et al. | 166/280 |
| 4,072,193 | 2/1978 | Sarda et al. | 166/280 |
| 4,304,604 | 12/1981 | Daerr et al. | 501/38 |
| 4,326,040 | 4/1985 | Kaji et al. | 501/105 |
| 4,379,111 | 4/1983 | Smith et al. | 501/38 |
| 4,421,861 | 12/1983 | Claussen et al. | 501/103 |
| 4,427,068 | 1/1984 | Fitzgibbon | 166/280 |
| 4,440,866 | 4/1984 | Lunghofer | 501/127 |
| 4,547,468 | 10/1985 | Jones et al. | 166/280 |
| 4,553,601 | 11/1985 | Almond et al. | 166/308 |
| 4,555,493 | 11/1985 | Watson et al. | 501/128 |

FOREIGN PATENT DOCUMENTS

| 521930 | 5/1979 | Australia | 166/280 |
| 873627 | 6/1971 | Canada | 51/309 |

Primary Examiner—Helen M. McCarthy
Attorney, Agent, or Firm—Rufus M. Franklin

[57] ABSTRACT

Aluminous proppant media in the form of sintered bauxite spheres containing silica are improved in resistance to stress corrosion by inclusion of zirconia in the mix prior to firing in the amount of a silica to zirconia ratio of from 6/1 to 20/1.

3 Claims, No Drawings

STRESS-CORROSION RESISTANT PROPPANT FOR OIL AND GAS WELLS

BACKGROUND OF THE INVENTION

The preferred proppants for gas or oil wells, at depths where silica sand is unsatisfactory due to the overburden pressure, are sintered bauxites containing from 3 to 40% of silica. The strongest proppants are made from relatively high purity bauxite. Higher silica content raw materials are used, however, to provide a lower density proppant with a sacrifice in strength and chemical stability as more silica is present in the product. Such proppants have been made from high silica bauxite with a silica content of 15 to 19% and from mixtures of bauxite or diaspore clay with higher silica content. This invention relates to proppants containing 10% or more silica with alumina.

Such proppants are made by pelletization of a mix in an intensive mixer and are taught in Australian Pat. No. 521930 issued Oct. 19, 1982, U.S. co-pending application Ser. No. 06/628,015, filed July 5, 1984, and U.S. Pat. No. 4,427,068, to Kennecott Corporation, or by a spray granulation method, as taught in U.S. Pat. No. 4,440,866.

Such proppants generally contain mullite ($3Al_2O_3$—$2SiO_2$), alumina, and glass. Although the glass phase can be minimized by employing mixes of lower silica content, some glass phase is always present. Such glasses are undesirable in that they are more subject to corrosive attack by aqueous brines (present in the wells), under the influence of an applied stress, that is, in particular are subject to stress corrosion, leading to a decrease, with time, in the permeability of the proppant pack in the well. This decrease in permeability occurs both in the proppants containing 10 to 19% silica and even more so in the higher silica products and is a result of the stress activated corrosive strength degradation (i.e. failure) of ceramic proppants.

SUMMARY OF THE INVENTION

The present invention resides in the discovery that the resistance to corrosion of silica containing aluminous proppants can be significantly improved by the addition of a small amount of zirconia to the raw mix used to produce the proppant. The zirconia can be in the form of $ZrO_2$ or may be added as a salt or in the form of zircon to the mix. If added in solid form, it must be finely divided or may be added to the raw materials before milling so that it is reduced in size along with the other mix ingredients. Forming and firing may be conducted in the normal manner, as practiced in the art. For proppants containing 15 to 19% silica, between 1 and 2% of zirconium oxide, based on analysis of the fused product, should be added. More than 2% has been found ineffective, at such silica levels, and less than 0.7% has been found to be much less effective than 1.3% at average 17% silica levels. Increased silica content requires increased amounts of zironia. Thus at 40% silica, about 4% $ZrO_2$ is required for optimum results. The level of zirconia required is also believed to be increased as the amount of alkali and alkaline earth oxides present in the mix increases. A ratio, by weight, of zirconia to silica, when the silica content is 10% or more, of from 1/20 to 1/6 is effective. These weight ratios refer to the silica content calculated as $SiO_2$ and to the zirconia content calculated as $ZrO_2$ even though these compounds are combined, in the case of silica, in the mullite and in the glass, and in the case of zirconia, presumably in the glass.

It has also been found that it is desirable to produce a smooth, flaw free, surface on the proppant spheres. Such surface can be controlled to some extent by control of the pelletizing methods, which may be the mixer pelletization or the spray granulation method.

SPECIFIC EMBODIMENTS OF THE INVENTION

Table I shows the analysis of five batches of bauxite used to make proppant by the mixer-pelletization technique. In batches 2 through 4, zirconia powder was added to give the indicated analysis for % $ZrO_2$, except for batches 1 and 5 in which the zirconia was present in the bauxite as mined. The analysis is for the fired product.

TABLE I

| Batch # | % $ZrO_2$ | % $SiO_2$ | % $Fe_2O_3$ | % CaO | % $Al_2O_3$ (by difference) |
|---|---|---|---|---|---|
| 1 | 0.61 | 15.36 | 6.29 | 0.10 | 77.6 |
| 2 | 1.33 | 15.58 | 6.07 | 0.11 | 76.9 |
| 3 | 1.96 | 14.22 | 5.98 | 0.11 | 77.7 |
| 4 | 2.60 | 14.30 | 6.04 | 0.12 | 76.9 |
| 5 | 0.33 | 15.3 | 6.15 | 0.12 | 78.1 |

Each batch was milled to reduce the particle size to an average of about 4.5 microns. The mixes were pelletized in an intensive mixer with 2% of a starch gum binder. Except for batch 5, extra care was taken in the pelletization to produce a smooth surface on the pellets.

After drying, the materials were fired at 1450° to 1460° C. in a rotary kiln to a density of 3.2 to 3.3 grams/cc.

Each material was then subject to conductivity testing in a test cell at 200° F., in the presence of 2% KCl aqueous solution, and a closure pressure of 8,000 pounds per square inch. The following table shows the resulting conductivities in milli-darcy-feet, and the % retained conductivity at the start of the test and after 66 to 72 hours of exposure to the hot brine.

TABLE II

| Batch # | Conductivity at time = 0 | Conductivity after 66 to 72 hours | % Conductivity Retained | Wt. Ratio $SiO_2/ZrO_2$ |
|---|---|---|---|---|
| 1 | 7698 | 6246 | 81.1 | 25.2 |
| 2 | 6788 | 6645 | 97.9 | 11.7 |
| 3 | 7669 | 6226 | 81.2 | 7.3 |
| 4 | 8343 | 6533 | 78.3 | 5.6 |
| 5 | 5471 | 3952 | 65.4 | 46 |

What is claimed is:

1. In a proppant medium composed of spherical particles of a sintered composition of alumina, silica, and the impurities associated with bauxite, such impurities selected from the group consisting of alkali and alkaline earth, oxides, iron oxide, and titanium oxide, the improvement wherein there is at least 15% silica in the composition and zirconium oxide is present in the ratio of between one part of zirconia per twenty parts of silica to one part of zirconia per six parts of silica by weight, the proppant spheres as fired, consisting essentially of mullite, alumina, and glass, the silica content in the weight ratio being calculated as $SiO_2$ combined in the mullite phase and $SiO_2$ in the glass phase, and zironia content calculated as $ZrO_2$ and present in the glass phase.

2. A proppant as in claim 1 with up to 19% silica and from 1 to 2% zirconia, made by the pelletization and sintering of bauxite to which a source of zirconia has been added.

3. A proppant as in claim 1 made from bauxite and a source of zirconia selected from the group consisting of zirconia, zirconium silicate, and zirconium salts.

* * * * *